United States Patent
Nagy et al.

(10) Patent No.: US 7,164,904 B2
(45) Date of Patent: Jan. 16, 2007

(54) MULTIPLE-PROCESSOR WIRELESS MOBILE COMMUNICATION DEVICE

(75) Inventors: Thomas C. Nagy, Waterloo (CA); Christopher Pattenden, Waterloo (CA); Sean B. Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 724 days.

(21) Appl. No.: 10/352,585

(22) Filed: Jan. 28, 2003

(65) Prior Publication Data

US 2003/0143973 A1    Jul. 31, 2003

Related U.S. Application Data

(60) Provisional application No. 60/351,419, filed on Jan. 28, 2002.

(51) Int. Cl.
*H04M 11/00* (2006.01)
(52) U.S. Cl. .............. 455/403; 455/403; 455/410; 455/412.2; 455/415; 455/424
(58) Field of Classification Search .............. 455/403, 455/410, 412.2, 415, 424, 426.1, 88, 566; 714/746, 749; 370/349; 375/365, 366
See application file for complete search history.

(56) References Cited

U.S. PATENT DOCUMENTS

| | | | | |
|---|---|---|---|---|
| 4,882,765 A | * | 11/1989 | Maxwell et al. | 455/18 |
| 4,939,724 A | * | 7/1990 | Ebersole | 370/407 |
| 6,356,991 B1 | * | 3/2002 | Bauman et al. | 711/209 |
| 6,430,164 B1 | * | 8/2002 | Jones et al. | 370/313 |
| 6,694,471 B1 | * | 2/2004 | Sharp | 714/749 |
| 6,807,564 B1 | * | 10/2004 | Zellner et al. | 709/206 |
| 6,880,070 B1 | * | 4/2005 | Gentieu et al. | 712/228 |
| 7,013,419 B1 | * | 3/2006 | Kagan et al. | 714/749 |
| 2001/0034788 A1 | * | 10/2001 | McTernan et al. | 709/232 |
| 2002/0012585 A1 | * | 1/2002 | Kalkunte et al. | 415/137 |
| 2002/0049068 A1 | * | 4/2002 | Koo et al. | 455/522 |
| 2002/0172198 A1 | * | 11/2002 | Kovacevic | 370/389 |
| 2003/0067907 A1 | * | 4/2003 | Rezaiifar et al. | 370/349 |
| 2003/0110435 A1 | * | 6/2003 | Wu et al. | 714/748 |
| 2003/0140296 A1 | * | 7/2003 | Odman | 714/749 |
| 2004/0025018 A1 | * | 2/2004 | Haas et al. | 713/168 |
| 2005/0153729 A1 | * | 7/2005 | Logan et al. | 455/550.1 |
| 2005/0259687 A1 | * | 11/2005 | Abrol et al. | 370/469 |
| 2006/0035685 A1 | * | 2/2006 | Janninck et al. | 455/575.1 |

\* cited by examiner

*Primary Examiner*—Duc Nguyen
*Assistant Examiner*—Eric J Elcenko
(74) *Attorney, Agent, or Firm*—Jones Day; Krishna K. Pathiyal; Robert C. Liang

(57) ABSTRACT

A multiple-processor wireless mobile communication device is disclosed. A wireless mobile communication device includes a first processor with which software applications are configured to operate, a second processor configured to manage wireless communication operations, and a communication link between the first and second processors. A reliable communications protocol is used for communications between the first and second processors to ensure that control data sent from either one of the processors is received by the other processor.

80 Claims, 7 Drawing Sheets

MULTIPLE-PROCESSOR WIRELESS MOBILE COMMUNICATION DEVICE

CROSS-REFERENCE TO RELATED APPLICATION

This application claims the benefit of and priority to U.S. Provisional Patent Application Ser. No. 60/351,419, filed Jan. 28, 2002, the entire disclosure of which is incorporated herein by reference.

BACKGROUND

1. Technical Field

This invention relates generally to wireless mobile communication devices and in particular to such a device with multiple processors.

2. Description of the State of the Art

In wireless mobile communication devices, referred to herein primarily as "mobile devices", a single processor typically handles all device functionality, including device software applications, data processing, and communication functions, for example. However, in order to operate on some modern wireless communication networks, a mobile device must include a particular processor or type of processor. For example, the iDEN™ communication network developed by Motorola is one such network that requires a particular mobile device processor.

This processor requirement may be met for new mobile devices by developing operating system software and software applications targeted to a required processor. For existing mobile devices for which operating systems and software applications have already been developed based on a different processor however, providing for mobile device operation on such a network while maintaining device functionality can be much more challenging. Mobile device manufacturers must either port all device software to a new platform associated with the required processor or develop software to emulate the new platform on an existing device platform and processor, either of which can involve significant development time and effort.

SUMMARY

In accordance with the teachings disclosed herein, a wireless mobile communication device comprises a first processor with which software applications are configured to operate, a second processor configured to manage wireless communication operations, and a communication link between the first and second processors. Optionally, a reliable communications protocol is used for communications between the first and second processors via the communication link to ensure that data sent from either one of the processors is received by the other processor. Further features will be described or will become apparent in the course of the following detailed description.

DETAILED DESCRIPTION

Figure 1:
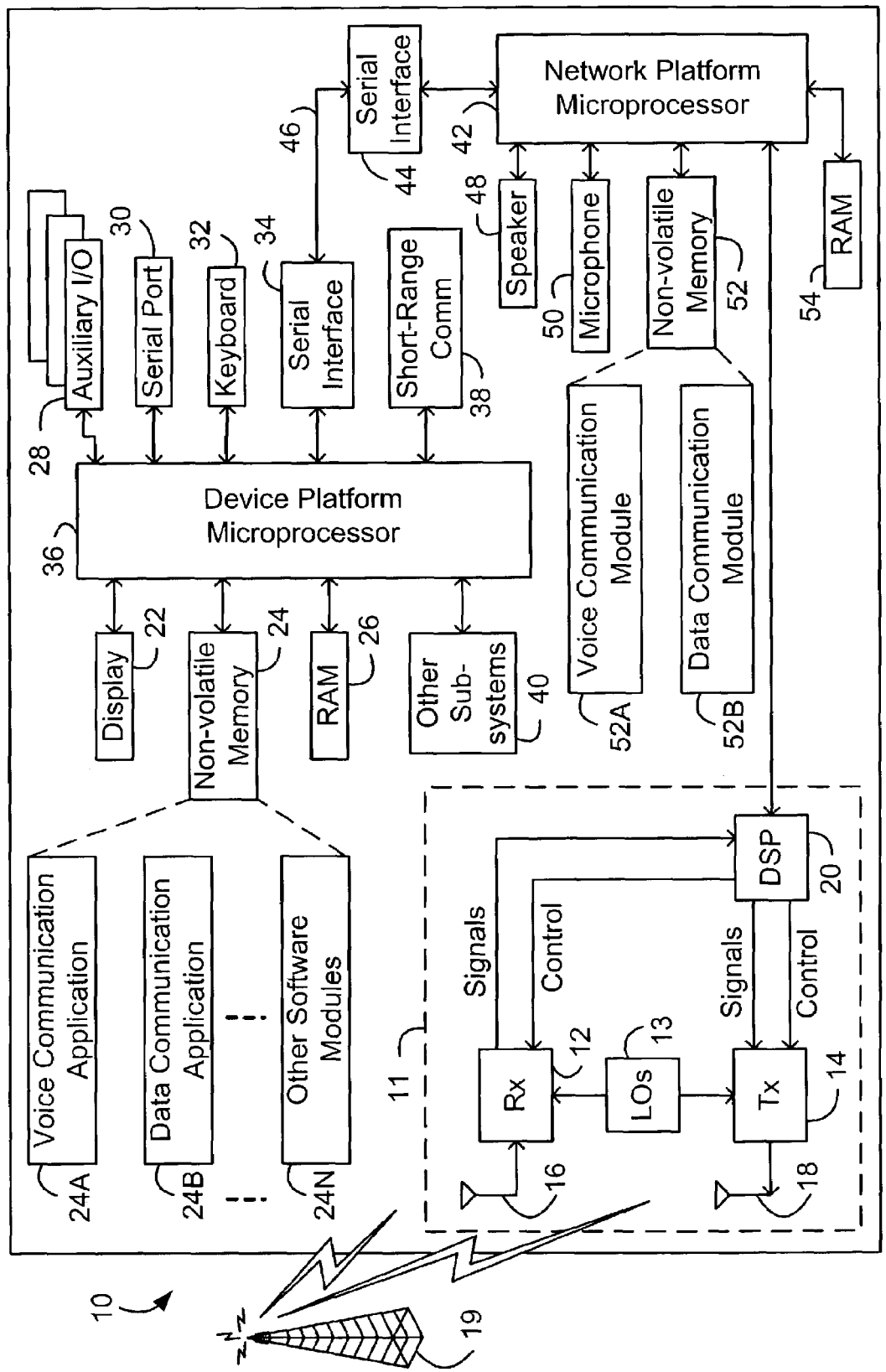
FIG. 1 is a block diagram of a multiple-processor mobile device.

FIG. 1 depicts at 10 a multiple-processor mobile device. The mobile device 10 shown in FIG. 1 is a dual-mode device having both data and voice communication functions. However, it should be appreciated many implementation may be used, such as but not limited to voice-only, data-only or possibly other types of multiple-mode devices, including, for example, cellular telephones, PDAs enabled for wireless communications, one-way and two-way pagers, wireless email devices and wireless modems. The mobile device 10 includes a transceiver 11, a first microprocessor 36, and a second microprocessor 42, as well as components associated with each microprocessor. These components include a display 22, a non-volatile memory 24, a RAM 26, auxiliary input/output (I/O) devices 28, a serial port 30, a keyboard 32, a serial interface 34, and a short-range communications subsystem 38 associated with the first microprocessor 36, as well as a serial interface 44, a speaker 48, a microphone 50, a non-volatile memory 52 and a RAM 54 associated with the second microprocessor 42. Such a device also typically includes other device subsystems shown generally at 40. Although the other device subsystems 40 are shown as being associated with the first microprocessor 36, these subsystems may be associated with either, or possibly both, of the microprocessors 36, 42.

The mobile device 10 is preferably a two-way communication device having voice and data communication capabilities. Thus, for example, the mobile device 10 may communicate over a voice network, such as any of the analog or digital cellular networks, and may also or instead communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the wireless network 19, and includes a receiver (Rx) 12, a transmitter (Tx) 14, one or more local oscillators (LOs) 13, and a digital signal processor (DSP) 20. The DSP 20 sends communication signals to the transmitter 14 and receives communication signals from the receiver 12. In addition to processing communication signals, the DSP 20 also provides for receiver and transmitter control. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11.

If device communications through the wireless network 19 occur at a single frequency or a closely-spaced set of frequencies, then a single local oscillator 13 may be used in conjunction with the transmitter 14 and receiver 12. Alternatively, if different frequencies are utilized for voice communications versus data communications or transmission versus reception, then a plurality of local oscillators 13 can be used to generate a plurality of corresponding frequencies. Although two antennas 16 and 18 are depicted in FIG. 1, the mobile device 10 could be used with a single antenna structure. Information, which includes both voice and data information, is communicated to and from the communication module 11 via a link between the DSP 20 and the second microprocessor 42, as will be described in further detail below. The detailed design of the communication subsystem 11, such as frequency band, component selection, power level, etc., will be dependent upon the wireless network 19 in which the mobile device 10 is intended to operate.

After any required network registration or activation procedures, which may also be different for different communication networks, have been completed, the mobile device 10 may then send and receive communication signals, including both voice and data signals, over the wireless network 19. Signals received by the antenna 16 from the wireless network 19 are routed to the receiver 12, which provides for such operations as signal amplification, frequency down conversion, filtering, channel selection, and analog to digital conversion. Analog to digital conversion of a received signal allows more complex communication functions, such as digital demodulation and decoding, to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the wireless network 19 via the antenna 18.

The first microprocessor 36, labelled as a device platform microprocessor but also referred to herein as the first processor, manages primarily non-communication functions of the mobile device 10, whereas the second microprocessor 42, the network platform microprocessor or second processor, manages communications between the mobile device 10 and the wireless network 19. As described above, some wireless networks 19, such as iDEN, are intended to operate only with a particular processor or type of processor. The multiple-processor arrangement shown in FIG. 1 addresses one or more problems associated with adapting a mobile device for operation on a processor-specific communication network, as will be described in further detail below.

Operating system software used by the first processor 36 is preferably stored in a persistent store such as the non-volatile memory 24, which may be implemented, for example, as a Flash memory or battery backed-up RAM. In addition to the operating system, which controls low-level functions of the mobile device 10, the non-volatile memory 24 includes a plurality of high-level software application programs or modules, such as a voice communication software application 24A, a data communication software application 24B, an organizer module (not shown), or any other type of software module 24N. These modules are executed by the first processor 36 and provide a high-level interface between a user of the mobile device 10 and the mobile device 10. This interface typically includes a graphical component provided through the display 22, and an input/output component provided through an auxiliary I/O 28 and/or the keyboard 32. The operating system, specific device software applications or modules, or parts thereof, may be temporarily loaded into a volatile store such as RAM 26 for faster operation. Moreover, received communication signals may also be temporarily stored to RAM 26, before permanently writing them to a file system located in the non-volatile memory 24 for storing data.

An exemplary software module 24N that may be loaded onto the mobile device 10 is a personal information manager (PIM) application providing PDA functionality, such as calendar events, appointments, and task items. This module 24N may also interact with the voice communication software application 24A for managing phone calls, voice mails, etc., and may also interact with the data communication software application for managing e-mail communications and other data transmissions. Alternatively, all of the functionality of the voice communication application 24A and the data communication application 24B may be integrated into the PIM module.

The non-volatile memory 24 preferably provides a file system to facilitate storage of PIM data items on the device. The PIM application preferably includes the ability to send and receive data items, either by itself or in conjunction with the voice and data communication applications 24A, 24B, via the second processor 42 and the wireless network 19. The PIM data items are preferably seamlessly integrated, synchronized and updated, via the wireless network 19, with a corresponding set of data items stored at or associated with a host computer system, thereby creating a mirrored system for data items associated with a particular user.

The mobile device 10 may also be manually synchronized with a host system by placing the mobile device 10 in an interface cradle, which couples the serial port 30 of the mobile device 10 to the serial port of the host system. The serial port 30 may also be used to enable a user to set preferences through an external device or software application, or to download other application modules 24N for installation on the mobile device 10. This wired download path may be used to load an encryption key onto the mobile device 10, which is a more secure method than exchanging encryption information via the wireless network 19. Other types of wired external interface to the mobile device 10, such as a USB port, may also or instead be provided.

Additional application modules 24N may be loaded onto the mobile device 10 through the wireless network 19, through an auxiliary I/O subsystem 28, through the serial port 30, through the short-range communications subsystem 38, or through any other suitable subsystem 40, and installed by a user in the non-volatile memory 24 or RAM 26. The short-range communications subsystem 38 may, for example, be an infrared device and associated circuits and components such as an Infrared Data Association (IrDA) port, or a short-range wireless communication module such as a Bluetooth™ module or an 802.11 module, to provide for communication with similarly-enabled systems and devices. Those skilled in the art to which the present invention pertains will appreciate that "Bluetooth" and "802.11" refer to sets of specifications, available from the Institute of Electrical and Electronics Engineers (IEEE), relating to wireless personal area networks and wireless local area networks, respectively. Such flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The software modules shown at 24A, 24B and 24N represent device functions or software applications that are configured to be executed by the first processor 36. In most known mobile devices, a single processor manages and controls the overall operation of the mobile device as well as all device functions and software applications, including wireless network communications via the transceiver 11. In the mobile device 10 however, the network platform microprocessor 42, hereinafter referred to primarily as the second processor, is provided to manage network communications. The second processor 42 is a processor required for operation on the wireless network 19. Therefore, a multiple-processor mobile device such as 10 is used when a mobile device incorporating functions and applications that are built on one processor or platform is to be adapted for use on a network such as iDEN, which requires a different processor. A mobile device such as 10 allows such adaptation of a mobile device without having to re-develop existing device functions and software applications for the different processor or emulate the different processor.

Through the serial interfaces 34 and 44 and a serial link 46, the first processor 36 controls the second processor 42 to thereby enable network communication functions for the mobile device 10 on a wireless network 19 on which a device having only the first processor 36 could not normally operate. Communication signals that are received by or to be sent from the mobile device 10 through the transceiver 11 and the wireless network 19 are exchanged between the first processor 36 and second processor 42. Therefore, the mobile device 10 appears to the wireless network 19 to be a network-compatible device, since the required processor (the second processor 42) manages all network communication functions, but may provide enhanced functionality to a user, particularly when the first processor 36 is a more powerful processor than the second processor 42.

The second processor 42 also interfaces with other device components in addition to the transceiver 11. Voice and data communication software modules 52A and 52B, resident in the non-volatile memory 52, provide communication functionality according to network requirements. The RAM 54 is implemented in the mobile device 10 for temporary storage of received communication signals, program data and the like. The speaker 48 and microphone 50 provide inputs and outputs for voice communications. Since the second processor 42 manages network communications, it is most practical to implement the speaker 48 and the microphone 50 to interface with the second processor 42. For an iDEN device, for example, those skilled in the art will appreciate that the second processor 42, an iDEN processor, has its own set of functions, including voice communications capabilities. Other functions of the second processor 42 could also similarly be retained if needed. Moreover, a base device with a processor 36 may also have a rich feature set, such that many of the features associated with typical implementations of the second processor 42 would not be required. In some multiple-processor dual-mode devices, the speaker 48 and microphone 50 could be configured for operation with the first processor 36 instead of the second processor 42. Thus, the second processor 42 manages at least communication functions and may optionally provide other functions.

When the mobile device 10 is operating in a data communication mode, a received signal, such as a text message or a web page download, is processed by the transceiver 11 and provided to the second processor 42, which may further process the received signal, possibly store the received signal to the RAM 54 or the non-volatile memory 52, and forward it to the first processor 36 through the serial link 46 and interfaces 44 and 34. Those skilled in the art will appreciate that in packet-based networks, communication signals are broken into one or more packets for transmission. Each received packet in a particular data communication operation is preferably forwarded to the first processor 36 as it is received.

The first processor 36 may then process a received signal or packets for output to the display 22 or alternatively to an auxiliary I/O device 28, and possibly store the received signal or packets or processed versions thereof in the RAM 26 or the non-volatile memory 24. A user of the mobile device 10 may also compose data items, such as email messages, for example, using the keyboard 32, which is preferably a complete alphanumeric keyboard laid out in the QWERTY style, although other styles of complete alphanumeric keyboards such as the known DVORAK style may also be used. User input to the mobile device 10 is preferably further enhanced with the auxiliary I/O devices 28, which may include such input devices as a thumbwheel input device, a touchpad, a variety of switches, a rocker input switch, etc. The composed data items input by the user are then sent to the second processor 42 over the serial link 46 and then transmitted over the wireless network 19 via the transceiver 11. Outgoing communication signals are stored by either the first processor 36 (in the non-volatile memory 24 or the RAM 26), the second processor 42 (in the non-volatile memory 52 or the RAM 54), or possibly both.

When the mobile device 10 is operating in a voice communication mode, its overall operation is substantially similar to the data mode, except that communication signals are processed primarily by the second processor 42. Received signals are output to the speaker 34 and voice signals for transmission are generated using the microphone 36. However, alternative voice or audio I/O subsystems, such as a voice message recording subsystem, may also be implemented on the mobile device 10 and associated with either the first processor 36 or the second processor 42. Although voice or audio signal output is preferably accomplished primarily through the speaker 34, the display 22 may also be used to provide an indication of the identity of a calling party, the duration of a voice call, or other information related to voice calls. For example, the second processor 42 may be configured to detect caller identification information for an incoming call and to send the information to the first processor 36 via the serial link 46. The first processor 36 then processes the caller identification information and displays it on the display 22.

Operation of the mobile device 10 will now be described in further detail in the context of an illustrative of example of an iDEN mobile device, where the second processor 42 is an iDEN processor.

Radio Application Layer Protocol (RALP) is one protocol that may be used to control the iDEN radio protocol stack from outside an iDEN mobile device, allowing one to turn a device transceiver on and off, begin and end calls, and the like. Currently, iDEN devices accept RALP packets using the BISYNC protocol, or alternatively using User Datagram Protocol over Internet Protocol (UDP/IP). Those skilled in the art will be familiar with both these protocols. Normally, one connects to an iDEN mobile device using Point-to-Point Protocol (PPP), an open protocol used when sending packets from one side of a serial link to the other, and then RALP commands are sent over UDP/IP to the iDEN mobile device.

This known UDP/IP configuration is not always suitable for control data on mobile devices. For example, UDP/IP is not reliable. PPP packets have a checksum, which results in rejection of any malformed or damaged packets for which the checksum is not verified. Therefore, packets that are sent at one end of a serial link over PPP either make it up to the UDP/IP layer at a receiving end exactly as they were sent, or they are rejected and do not arrive at the receiving end UDP/IP layer at all. However, there is no provision for the sending side to determine that a packet was malformed when it was received, or that it should be resent for some other reason. RALP packets must generally arrive at their destination intact.

In addition, UDP/IP requires an IP address. An IP packet requires both a sending and receiving IP address to be specified. UDP also adds a sending port and a receiving port to these packets. A primary problem in this situation is that it is often desirable to establish a RALP communication link even when neither side has been yet assigned an IP address.

Furthermore, UDP/IP has no packet-level flow control. Because UDP/IP was designed as an unreliable so-called "fire and forget" protocol, it makes no provisions for flow control, that is, the stopping and restarting of a flow of packets from a sender when the receiver runs out of buffer space for the incoming packets. This is disadvantageous for mobile device control, where all RALP packets should arrive at their destination.

Although UDP/IP transport of RALP packets is already implemented in iDEN mobile devices, it provides, for the reasons above, drawbacks for a multiple-processor mobile device.

One possible alternative to UDP/IP would be to transport data via Transfer Control Protocol (TCP) over IP. TCP/IP is a reliable protocol which addresses two of the issues above. It is reliable, so there is little chance of packets not getting through, and this reliability means that packets that cannot be buffered at a receiving end can simply be discarded or dropped, since they will be sent again if they are not processed by the receiver.

However, TCP/IP also has some inherent disadvantages. TCP/IP, like UDP/IP, requires IP addresses. Although reliable, TCP/IP is relatively inefficient. A header of a TCP/IP packet is typically 40 bytes long. Almost all of this information is irrelevant to a RALP connection, and an inefficient protocol is particularly undesirable on a serial link, which has rather limited throughput. Header compression techniques may reduce header length and thus improve transfer efficiency, but requires rather complex software code at both ends of the connection. Such a solution would not be feasible for a serial link within mobile devices however, since both processing resources and memory space available for software code is typically limited.

TCP/IP may also be too all-encompassing for implementation on a mobile device. The serial connection between processors on a mobile device such as shown in FIG. 1 should have a reliable transport of RALP packets from one serial port or interface to another. For example, for such connections, there is no need for such TCP features as 32-bit packet sequence numbers, a checksum of the packet payload (since PPP already performs this), or separation of urgent packets from normal ones. Moreover, TCP/IP is designed as a streaming protocol which assumes that the data that it is sending is a continuous stream of bytes which may be interrupted anywhere, divided into packets, and then sent. Since RALP already processes its data into packets, this represents extreme redundancy for a simple packet transport system. TCP/IP is an excellent and widely used protocol for Local and Wide Area Network (LAN and WAN) and Internet applications, but was never intended for transport of prepacketized data over a short serial link.

There is currently no acceptable reliable way to send RALP packets over PPP. Part of the reason for this is that RALP has primarily been used as a testing protocol, rather than as an integral part of any product's functionality. Additionally, serial links are normally thought of as completely reliable. This approach could prove disastrous if RALP packets are dropped or corrupted in a system where RALP is used for important transactions. In the mobile device 10, wireless network communications are dependent upon reliable transfer of control data from the first processor 36 to the second processor 42 over the serial link 46. For example, if a long distance telephone call is initiated using the keyboard 32 or an auxiliary input device 28 and the voice communication software application 24A running on the first processor 36, then the actual wireless network communications are managed by the second processor 42. When a call end command is issued from the first processor 36 to the second processor 42, then it is imperative that the command be reliably transferred to the second processor 42. Many other situations in which command or data transfer between processors is crucial will be apparent to those skilled in the art. Reliable inter-processor control communications are therefore essential for multiple-processor mobile devices.

One alternative novel protocol intended for transfer of control data over the serial link between processors in a multiple-processor mobile device is described in detail below. This protocol is referred to herein as RRP, for the Reliable RALP Protocol. Another related new protocol, also described below, is RRPCP, for the RRP Configuration Protocol, which sets up a PPP link to accept RRP packets.

In general, RRP uses a system of packet sequence numbers and acknowledgements to ensure reliable transport of RALP packets in both directions on a serial link. It uses as little overhead as possible on the serial link, to maximize throughput. It also allows application data, such as user emails associated with a data communication application 24A on a mobile device 10, to be transmitted via UDP/IP in parallel with RRP. Although, as described above, UDP/IP is not suitable for transfer of important control data between processors, it may be used to transfer user data, which will be transferred from a mobile device over the air through the wireless network 19. Since the over-the-air link already provides a UDP/IP layer, inter-processor transfer of user data via UDP/IP provides for a simpler overall device architecture and operation. Thus, data from the wireless network 19 that arrives at the mobile device 10 is already packaged as UDP/IP packets and data to be sent over the wireless network 19 is similarly formatted as UDP/IP packets for serial link transfer on the mobile device 10. Also, the lack of reliability of UDP/IP is less important for user data, because wireless networks are inherently unreliable. Higher-level protocols on a mobile device generally handle user data transfer reliability concerns such as packet loss and the like. For user data, the additional measures required to improve the reliability of data transfer on the device itself is seldom justified, given that the data was or will eventually be transferred over an inherently unreliable network. Thus, RRP is used to control radio functions, while the actual data to be sent over the air is sent via UDP/IP. These two protocols share the PPP inter-processor link.

In order to provide for packet error checking, the checksum function provided by PPP is considered sufficient since physical layer errors on the serial link are expected to be infrequent and single-bit-per-frame in nature. However, the problem of corrupted packet rejection in standard PPP is addressed in RRP by using a packet sequence number and packet acknowledgements to allow a sender to ensure receipt of packets. Various flags may be defined for RRP packets and will be described in further detail below. The sync byte provided by PPP is also preferably retained in RRP, since framing may otherwise be lost.

Figure 2:
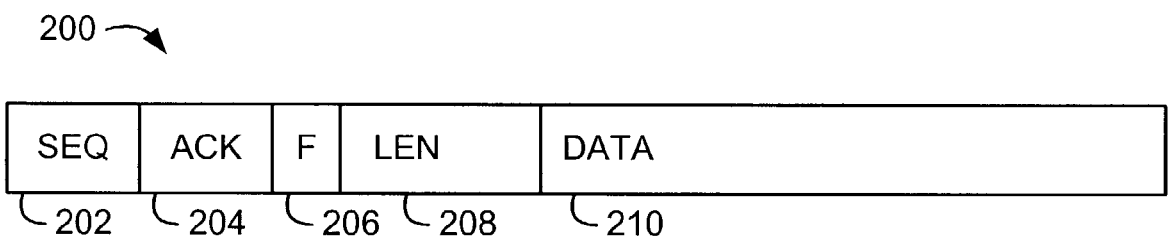
FIG. 2 is a data format diagram showing a data packet for communication between multiple processors on a mobile device.

FIG. 2 is a data format diagram showing a data packet used for communication between multiple processors on a mobile device, according to RRP. As shown, an RRP packet 200 preferably includes a sequence number (SEQ) 202, an acknowledgement number (ACK) 204, one or more flags (F) 206, a length field (LEN) 208 and data 210.

The sequence number 202 is a number assigned to each packet transmitted over the serial link between processors. Initialization of the sequence number 202 to 0 at the beginning of a connection allows a relatively short sequence number, preferably 1 byte, to be used. The sequence number 202 is preferably incremented by 1 for each transmitted RRP packet. Any time an RRPCP packet (described below) is sent or received to configure RRP, the connection is restarted, and SEQ is re-initialized to 0. Although 0 is a preferred initial value of SEQ, other values may instead be used without departing from the invention. Increments of other than 1 may similarly be used.

When an RRP packet is sent to acknowledge receipt of a packet, the ACK field 204 is the sequence number of the packet being acknowledged. The ACK field 204 is valid if an appropriate flag is set in the packet to indicate that the packet is an acknowledgement packet. Otherwise, ACK field 204 is preferably ignored and therefore may remain uninitialized.

The flags 206 in an RRP packet preferably include at least 4 one-bit flags. A reliable-packet flag indicates that certain actions must be performed at a receiving end of a link. An acknowledgement flag indicates that the packet is a packet receipt acknowledgement packet, and that the ACK field 204 is present and valid. These two flags enable a basic implementation of RRP. Since other flags may also be useful as RRP is further developed, additional flags are preferably provided and reserved for future use. With 4 flag bits in a preferred RRP packet 200, two reserved flags are available.

The length field 208 indicates the length, in bytes, of the data field 210 in the RRP packet 200. This is an additional data integrity check, in case some bytes are dropped and the packet still passes the PPP checksum. Since the longest possible PPP data field is 1500 bytes, and the longest packet payload length for a RALP packet is 1472 bytes when transported over IP, a reasonable maximum length setting for RRP packets is 1472 bytes. Where connection configuration negotiation is possible, larger payload lengths may be supported. Although the maximum length of 1472 may be specified in less than 12 bits, a 12-bit length field, in combination with the other RRP packet fields, provides a packet having a length of a whole number of bytes. A 12-bit length field also supports packets having longer payloads without requiring any change to packet formatting.

The data field 210 contains the payload of the packet. An empty data field 210 is preferably valid. This data is treated by RRP as opaque; any escaping of characters is done by a layer below RRP.

It should be appreciated that the RRP packet 200 is provided for illustrative purposes only. For example, additional packet fields and flags may be defined as required, the lengths and order of packet fields shown in FIG. 2 may be changed.

RRP may also make use of further mobile device resources. Timers and counters are preferably implemented to provide additional reliability for RRP. Where delayed receiving end acknowledgement is desired, a delayed acknowledgement timer is preferably established. As described in further detail below, delayed acknowledgement may be useful in reducing the number of acknowledgement packet transmissions. A retransmit timer is also preferably provided so that sent packets which have not been acknowledged after a certain period of time are retransmitted by a sender. Where delayed acknowledgement is used, it should be apparent that the retransmit timer must be set for a longer time period than the delayed acknowledgement timer. A packet retransmission counter may also be used to ensure that a mobile device does not sit in a frozen state, in which packets are repeatedly retransmitted and not acknowledged, for a long time. Such timers and counters are preferably configured to operate in conjunction with coefficients that may be reset from time to time. Delayed acknowledgement time, retransmit time and a maximum retransmission count might be established in software variables stored in a memory at each end of a link over which RRP is to be used, such that processors at each end of the link access and use the same time and count settings. Time and count values may then be changed by resetting the stored variables to different values.

Figure 3:
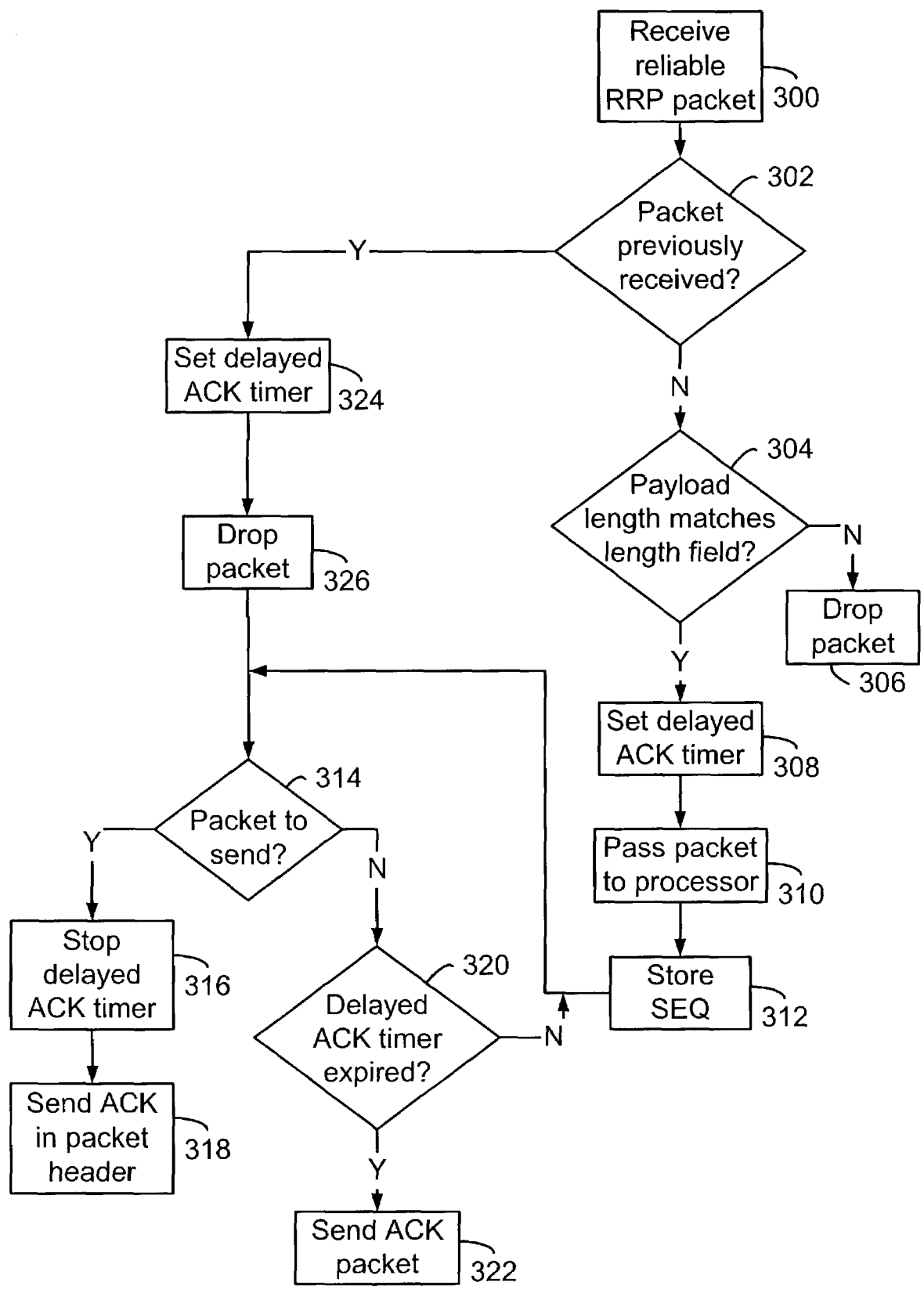
FIG. 3 is a flow diagram illustrating a method of processing received packets.
Figure 4:
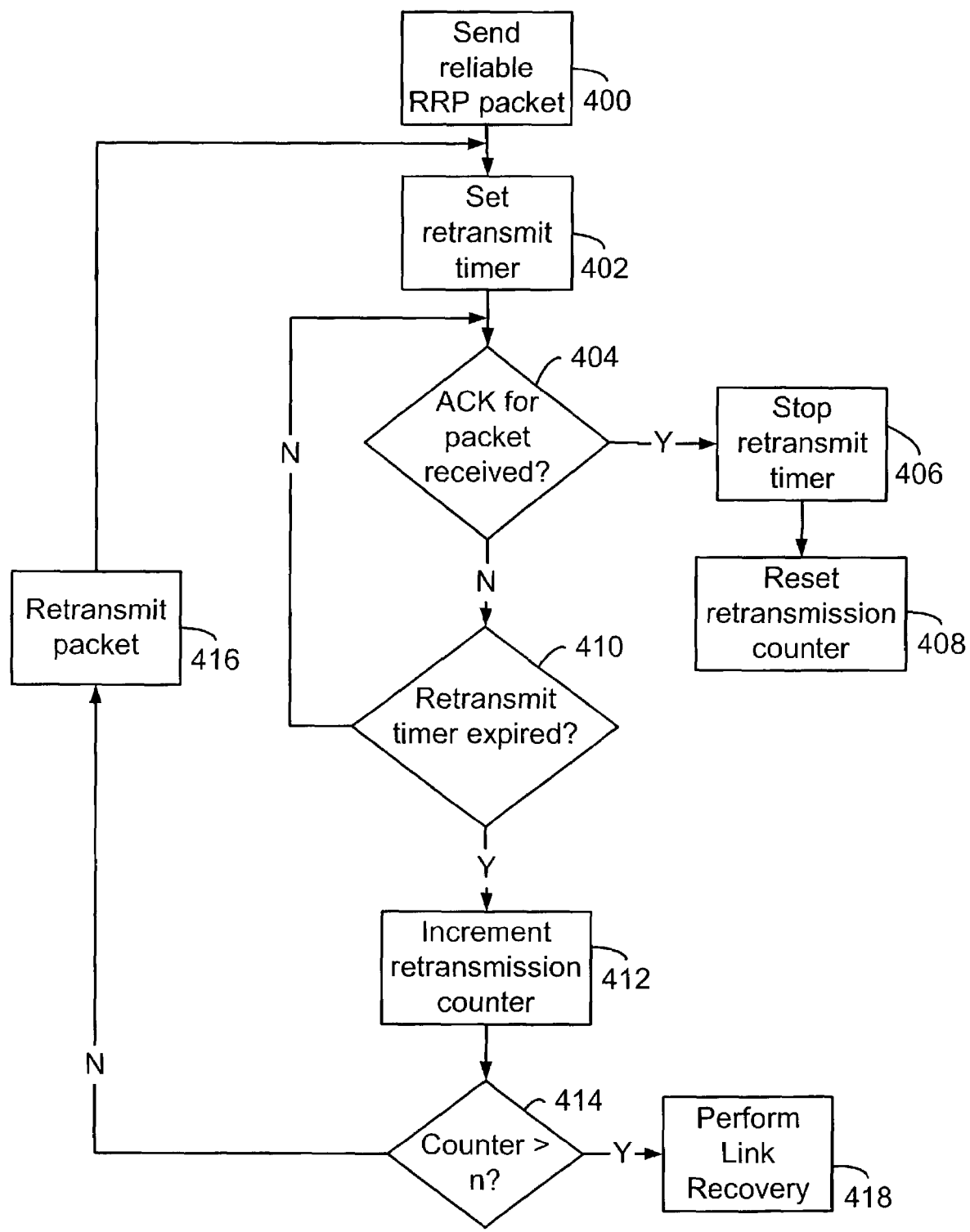
FIG. 4 is a flow diagram showing a method of sending packets.

Methods of receiving and sending RRP packets are described below in the context of an illustrative example and with reference to FIGS. 3 and 4. FIG. 3 is a flow diagram illustrating a method of processing received packets, and FIG. 4 is a flow diagram showing a method of sending packets.

In FIG. 3, when a reliable RRP packet X, indicated by the reliable-packet flag described above, is received at a receiving end of a link at step 300, the receiver checks the sequence number to determine whether packet X has been received before, at step 302. If not, then the receiver checks the length of the data field 210 to confirm that it is consistent with the length field 208, at step 304. If not, then packet X is in error and is dropped by the receiver at step 306. In RRP, a dropped packet will be retransmitted as described below, so it is safe for the receiver to drop packets. If the length of the data field 210 matches the length specified in the length field 208, then the receiver preferably sets its delayed acknowledgement timer at step 308 and forwards the packet X payload to the processor at the receiving end of the link, at step 310. At step 312, the receiver stores the sequence number of packet X, in a RAM such as 26 or 54 shown in FIG. 1, for example.

If the receiving end has an RRP packet to send while the delayed acknowledgement timer is active, as determined at step 314, the timer is stopped at step 316 and the acknowledgement for packet X is sent in the header of this new packet at step 318, by setting the acknowledgement flag and including the stored sequence number of packet X in the ACK field of the new packet. The use of a delayed acknowledgement timer thereby avoids transmission of a separate acknowledgement packet if the receiver sends a packet during the delayed acknowledgement time and thus may reduce traffic on the link. Otherwise, upon the expiry of the delayed acknowledgement timer, detected at step 320, the receiver sends an acknowledgement packet with only the sequence number of packet X and the ACK flag set in the packet header, at step 322. Acknowledgement packets preferably include no data (the length field is 0) in order to keep such packets small. In addition, the reliable-packet flag is preferably not set in acknowledgement packets, since no acknowledgement is expected for an acknowledgement packet. A receiver monitors for either a new packet to be sent or expiry of the delayed acknowledgement timer in steps 314 and 320.

If the original sender of packet X does not receive the acknowledgement packet for packet X, it will retransmit X as described in detail below. The original receiver that acknowledged packet X must then detect that a packet with this sequence number has already been received, at step 302, and will issue another acknowledgement. This acknowledgement, as above, may be a standalone acknowledgement packet or it may piggyback on another packet to be sent, provided that the delayed acknowledgement timer is set at step 324 before the packet is dropped at step 326. Thus, the sequence number of a received packet is preferably stored until a new RRP packet with a different sequence number is received, such that duplicate packets can be detected and dropped at a receiver. Acknowledgement of a duplicate packet proceeds at step 314 as described above, after the packet is dropped at step 326.

The receiver of packet X may itself send RRP packets regardless of how many re-transmissions of packet X are made. The sequence number for packet X may be placed in the ACK field 204 of multiple different packets sent by the receiver.

Referring now to FIG. 4, when a reliable RRP packet X (with sequence number SEQ) is sent by a sender at step 400, the sender sets its retransmit timer at step 402. This timer is stopped when an RRP packet with the acknowledgement flag set and packet X's sequence number in the ACK field is received at step 404. As described above, a receiver of packet X preferably stores the sequence number of packet X until another packet with a different sequence number is received. Therefore, in one embodiment of the invention, the sender may not transmit another reliable RRP packet until an acknowledgement for packet X has been received. When an acknowledgement for packet X is detected at step 404, the retransmit timer is stopped at step 406 and the retransmission counter (described below), if provided, is reset at step 408.

Each time expiry of the retransmit timer is detected at step 410, the retransmission counter, if provided, is incremented at step 412. If the retransmission counter is not above some maximum number, n, indicating that the same packet has been sent n times without an acknowledgement that the packet has been received (step 414), then the sender retransmits packet X at step 416 as originally transmitted, with the same sequence number, flag settings, ACK number, length and data fields. If it is determined at step 414 that the retransmission counter exceeds n, then link recovery procedures are preferably performed at step 418, as described in further detail below.

The above procedures also remove any need for flow control over a link using RRP. If a receiver does not have sufficient buffer space for a packet X sent by a sender, then packet X may be safely dropped by the receiver. The receiver can drop packet X since the sender will retransmit packet X when its retransmit timer expires, as described above.

Also, since duplicate packets are detected and dropped at a receiver and acknowledgements require no response from a sender of the packet being acknowledged, RRP also provides for a benign link probe. A link probe may be performed by retransmitting a previously-sent RRP packet. If a sender resends a packet X, then the receiver will simply drop packet X, reissue the ACK for X, and take no further action. Alternatively, an RRP packet with an empty data field is used to perform a benign link probe. Since the data field is empty, a receiver issues an ACK in response to such a packet, but no further data processing operations are required.

When either side has an RRP packet to send, assuming that there are no outstanding acknowledgements or retransmissions pending, it simply inserts the current sequence number into SEQ, sets the reliable-packet flag, clears the ACK flag, puts the length of the payload into the length field, sets its retransmit timer and sends the packet to PPP to be sent. ACK handling is performed as described above.

If a packet is not acknowledged after n attempts, then one of the processors in a mobile device, preferably a device platform processor 36 as shown in FIG. 1, closes and re-opens the PPP link as described below. This interrupts any UDP and RRP communications (along with any RALP communications) active on the link. If the link cannot be restarted, then a fatal error is preferably issued. The status of a link may be determined even when there has not been traffic on the link for a significant period of time by performing a link probe. For example, one of the mobile device processors may be configured to probe the link as described above after a certain period of inactivity on the link. If some sort of link failure has occurred, then the normal link recovery procedures are initiated after the retransmission count for the probe packet reaches the maximum.

PPP is preferably configured for RRP using RRPCP. At present, a preferred format for an RRPCP packet is the same as for Link Control Protocol (LCP) and IP Control Protocol (IPCP). These protocols are discussed only briefly below, since further details on these protocols can be found in RFC 1661 and RFC 1332, respectively.

RRPCP involves transfer of only up to two RRPCP packets by each side of a link—a configure-request packet and a configure-acknowledge packet, each of which has a payload length of zero. Configuration settings are preferably specified in the header of a configure-request packet in order to minimize the amount of data that is transferred to set up RRP.

In a preferred embodiment, each side of a link sends an RRPCP configure-request packet with length 0 to the other side, immediately after PPP has been established, for example. Alternatively, one side of the link initiates RRPCP by sending a first configure-request packet, and the other side sends its own configure-request packet when it receives the first configure-request packet. A protocol identifier field of an RRPCP configure-request packet identifies RRPCP, using a suitable protocol identifier. A particular value in a code field of an RRPCP packet is used to indicate that the packet is a configure-request packet. An identifier header field can be used as an identifier for the link or session and is similar to the sequence number described above, in that it provides a reference number for a configure-acknowledge packet. As mentioned above, no payload is sent with an RRPCP configure-request packet, such that a length header field is set to zero. It is also contemplated that certain options may be specified in a RRPCP configure-request packet.

Upon receiving an RRPCP configure-request packet, each side prepares to receive and send RRP packets, preferably initializes SEQ to 0, and responds with an RRPCP configure-acknowledge packet, which is identical to the configure-request packet except for the code field. In order to differentiate between configure-request and configure-acknowledge packets, different values are inserted in the code field. When options are specified in the configure-request packet, the corresponding configure-acknowledge packet might include different options fields, when a receiver of the configure-request packet cannot support all of the options specified in the configure-request packet. This type of exchange is applicable, for example, where link configuration settings are negotiated.

When a party receives an RRPCP configure-acknowledge packet, it can safely assume that it may begin sending RRP packets. Since both sides of the link send a configure-request packet in this embodiment, each side is assured that the other side is ready to receive RRP packets when a configure-acknowledge packet corresponding to its configure-request packet is received. As described above, RRP is used for transfer of control data, whereas another protocol such as UDP/IP may be used for transfer of user data, for example after a "radio on" command is issued by a first processor to a second processor.

In the above example, each side of a PPP link transmits a configure-request packet and a configure-acknowledge packet. In an alternative embodiment, RRP configuration is accomplished with a single configure-request packet from a first side of a link and a single configure-acknowledge packet from a second side of the link. In this case, however, the first side preferably prepares to send and receive RRP packets when it sends the configure-request packet instead of when it receives a configure-request packet, since the second side does not send a configure-request packet. Also, after it sends the configure-acknowledge packet in response to the configure-request packet, the second side of the link assumes that the first side is ready to receive RRP packets, as the first side does not return a configure-acknowledge packet.

A link configuration process using RRPCP is performed when a link is initially configured for RRP, but may also be repeated when a link error is suspected, for example when a sender has retransmitted a reliable RRP packet, including a packet sent to probe the link, the maximum number of times without receiving an acknowledgement for the packet. When an RRP link is reconfigured, the existing link is first torn down. In a preferred embodiment, RRPCP also supports a terminate-request packet and a terminate-acknowledge packet. One side of an existing RRP link sends a terminate-request packet to the other side to terminate the link. Upon receiving a terminate-request packet, the other side returns a terminate-acknowledge packet, and each side of the link tears down its respective RRP connection. A new RRP link is then configured as described above. It should also be appreciated that each side of an RRP link may send a terminate-request packet and a terminate-acknowledgement packet In an alternative embodiment, an existing RRP link is torn down whenever an RRPCP configure-request packet is received, and RRP configuration then proceeds as described above.

It will be appreciated that the above description relates to preferred embodiments by way of example only. Many variations on the invention will be obvious to those knowledgeable in the field, and such obvious variations are within the scope of the invention as described, whether or not expressly described.

For example, although described in the context of a stand-alone mobile device, the techniques described herein may be applied to other types of wireless communication devices, such as wireless modems which typically operate in conjunction with a computer system or other device. In addition, aspects of the invention have been described above for a serial link between processors. Alternative possible implementations to accomplish inter-processor control may include separate dedicated lines connected between the processors, wherein a single line is used for each control function, to start/end a call, and to activate/deactivate radio, for example, to be supported. Further possible implementations to which the invention is applicable include a shared memory system in which commands are written by one processor into a shared memory space and read out by the other processor. In this type of implementation, command acknowledgements and user data are also written to and read from the memory in a similar manner. A shared inter-processor bus, in which commands and responses are placed on the bus, is another alternative to the serial link described above.

Figure 5:
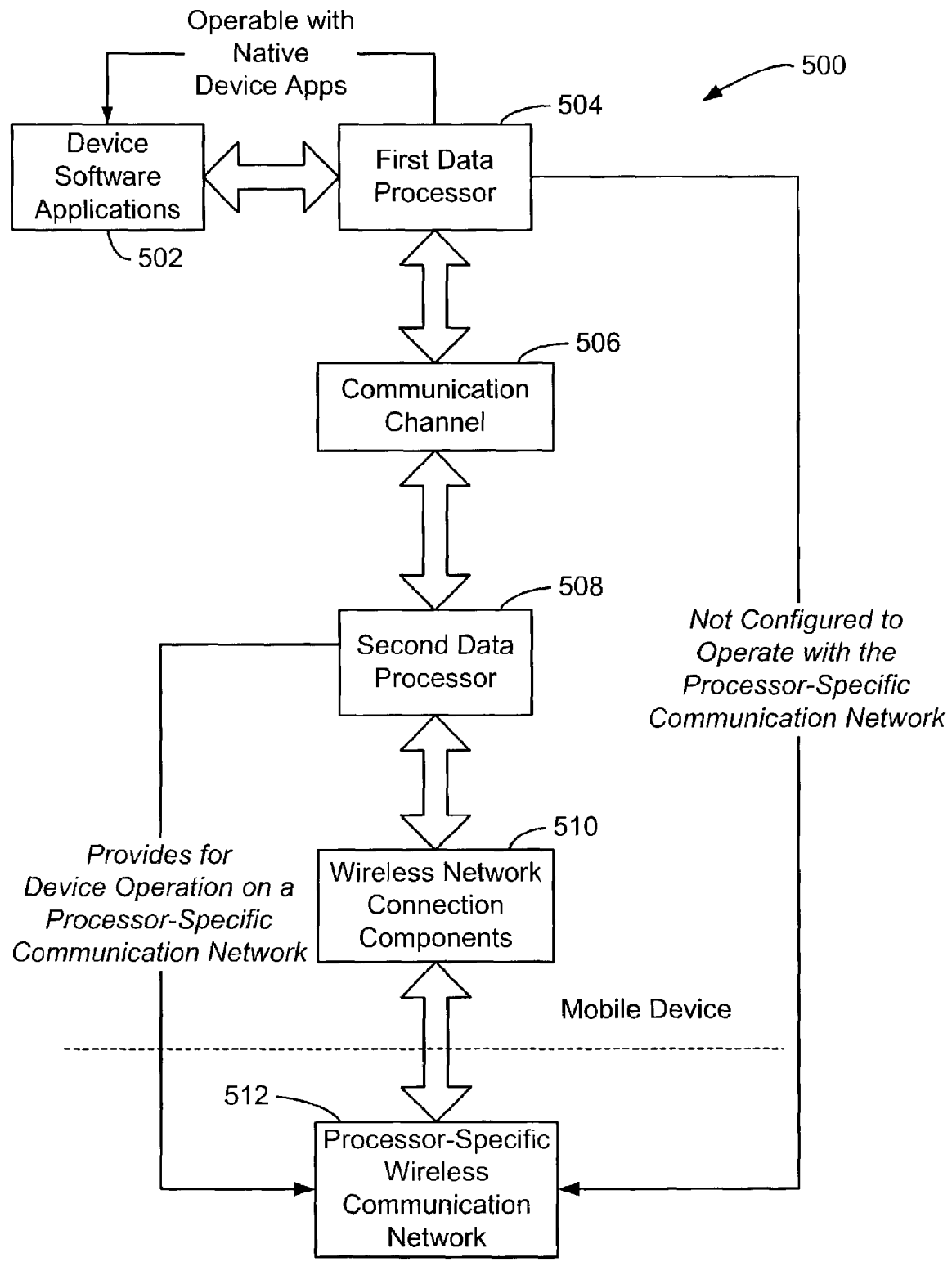
FIGS. 5–7 are block diagrams depicting system-level components of a multiple-processor mobile device.
Figure 6:
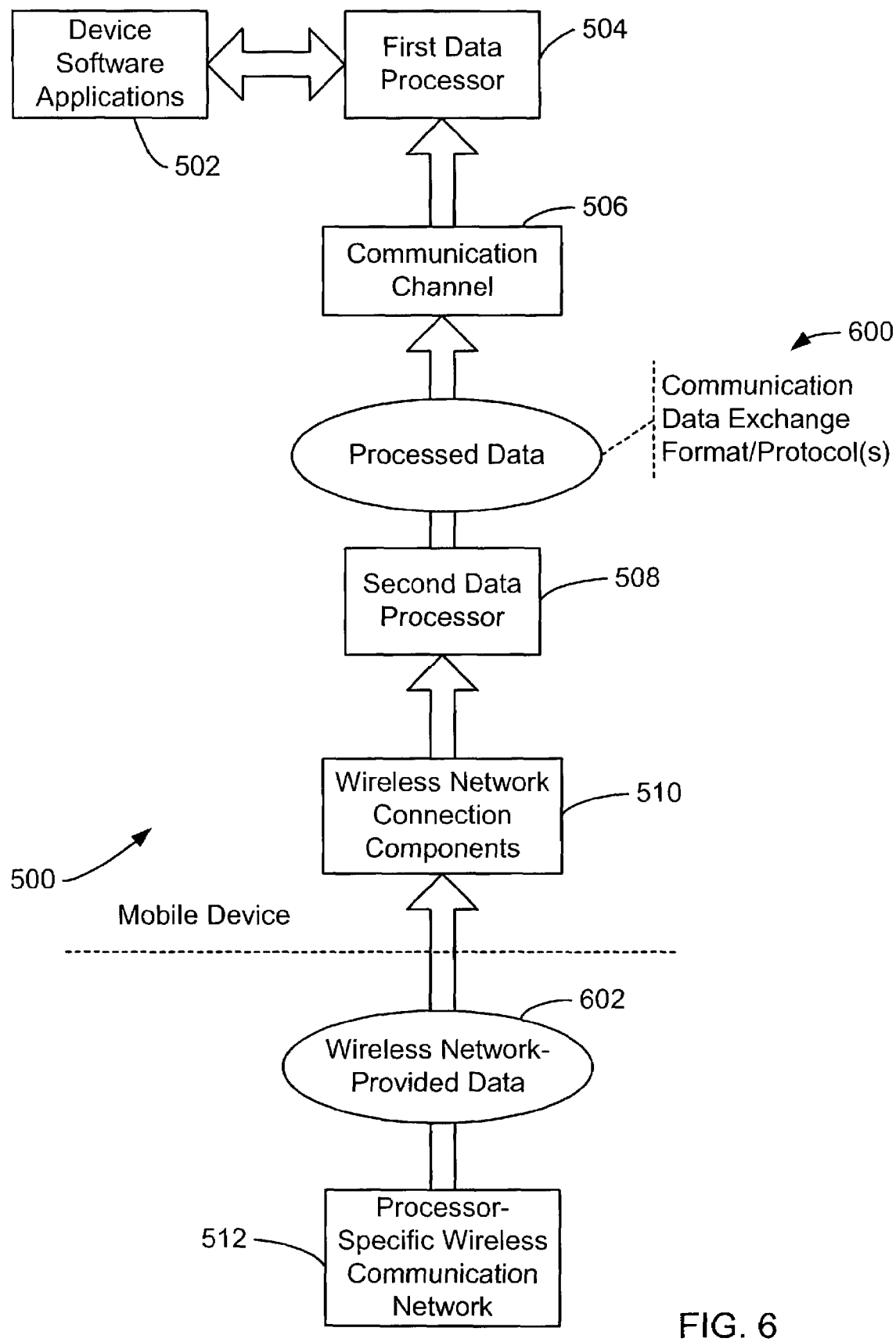
Figure 7:
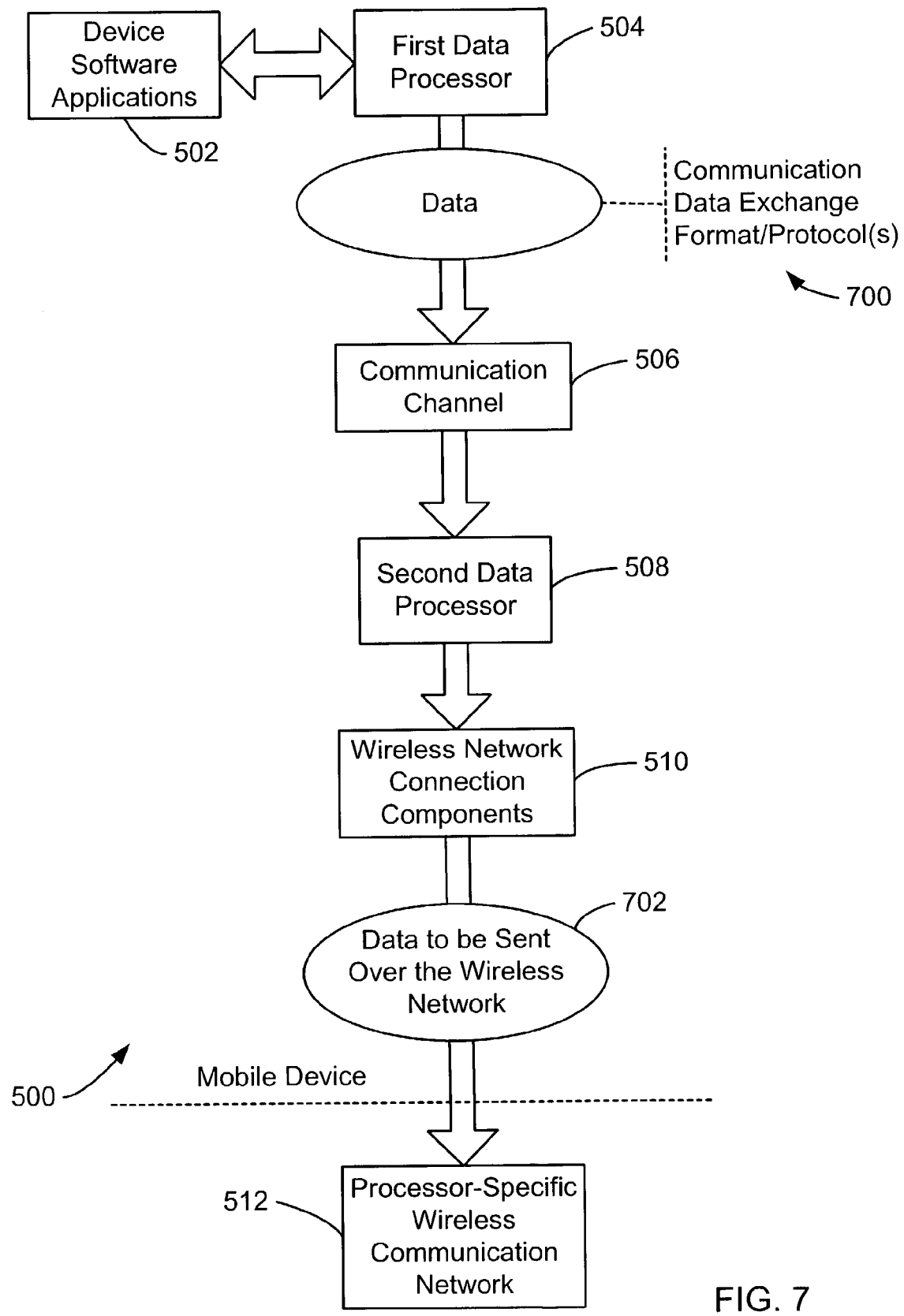

As yet another example of the broad applicability of the systems and methods disclosed herein, FIGS. 5–7 depict components of a multiple-processor mobile device 500. As shown in FIG. 5, multiple processors (504 and 508) operate within the mobile device 500, wherein the mobile device 500 is capable of data communications over a wireless network 512. The first data processor 504 is configured to be operable with at least one native mobile device software application 502, such as a personal information manager application. The second data processor 508 is configured to process data received from or to be sent over the wireless network 512. The first data processor 504 has a configuration such that the first data processor 504 is not operable with the wireless network 512 because the wireless network 512 requires a preselected data processor type, such as the second data processor 508.

A data communication channel 506 is disposed between the first data processor 504 and the second data processor 508 so that communication data signals that are received by or to be sent from the mobile device 500 through the wireless network 512 are exchanged between the first data processor 504 and second data processor 508 through the data communication channel 506. Such a system allows for device operation on a processor-specific communication network 512 through use of the second data processor 508 while maintaining a native device software platform through use of the first data processor 504. The wireless network connection components 510 include either or both of a receiver and a transmitter compatible with the wireless network 512.

With reference to FIGS. 6 and 7, different communication protocols may be used in the exchange of data (600 and 700) between the data processors (504 and 508). For example, a communication protocol may be used wherein the communication protocol comprises a first communication protocol to control radio functions of the mobile device 500 and a second communication protocol to handle data received from or to be sent over the wireless network 512. It is noted that the second data processor 508 may perform a substantial amount of processing upon the data 602 received from the wireless network 512 or may perform little or no processing upon the data 602. The situation at hand may dictate how much processing is performed.

It is claimed as the invention:

1. A system of enabling data communications over a wireless network, operable on a mobile device, comprising:
   a first data processor configured to be operable with at least one mobile device application;
   a second data processor of a preselected data processor type required for operation with the wireless network, configured to manage wireless communication operations with respect to the wireless network for the mobile device; and
   a data communication channel between the first data processor and the second data processor, wherein data that is received by or to be sent from the mobile device through the wireless network is exchanged between the first data processor and the second data processor through the data communication channel;
   wherein the first data processor and the second data processor acknowledge data received over the data communication channel;
   wherein data transmitted over the data communication channel by one of the first and second data processors is retransmitted over the data communication channel by the one of the first and second data processors after a retransmit time unless acknowledgement of the transmitted data is received from the other of the first and second data processors within the retransmit time;
   wherein the one of the first and second data processors initiates data communication channel recovery operations when the transmitted data has been retransmitted a predetermined number of times and no acknowledgement of the transmitted data is received from the other of the first and second data processors within the retransmit time.

2. The system of claim 1, wherein the mobile device is a two-way communication device having voice and data communication capabilities.

3. The system of claim 1, wherein the mobile device is a dual mode communication device having voice and data communication capabilities.

4. The system of claim 1, wherein the mobile device has data communication capabilities, and wherein the data received by or to be sent from the mobile device include data communication information.

5. The system of claim 1, wherein the mobile device has voice communication capabilities, and wherein the data which is received by or to be sent from the mobile device include voice communication information.

6. The system of claim 5, wherein the first data processor issues a call end command to the second data processor.

7. The system of claim 1, wherein the wireless network comprises separate communication networks using separate infrastructure for supporting voice and data communications.

8. The system of claim 1, wherein the wireless network comprises a single communication network for supporting voice and data communications.

9. The system of claim 1, wherein the at least one mobile device software application is configured to be operable with the first data processor, and wherein the at least one mobile device software application comprises a personal information manager application.

10. The system of claim 1, wherein the first data processor manages non-network communication functions of the mobile device, and wherein the second data processor manages communications between the mobile device and the wireless network.

11. The system of claim 1, wherein the mobile device provides for device operation on a processor-specific communication network through utilization of the second data processor while maintaining a native device software platform through utilization of the first data processor.

12. The system of claim 11, wherein the first data processor is unable to communicate directly with communication protocols utilized on the wireless network.

13. The system of claim 11, wherein the processor-specific communication network requires one or more particular mobile device processors.

14. The system of claim 1, wherein the first data processor is a different type of processor than the second data processor, and wherein the second data processor has a configuration such that the second data processor is operable with the wireless network.

15. The system of claim 1, wherein the first and second data processors have serial interfaces, and wherein the data communication channel comprises a serial link between the serial interfaces of the first and second data processors.

16. The system of claim 15, wherein the first data processor controls the second data processor through the serial interfaces and the serial link, and wherein the control of the second data processor by the first data processor enables network communication functions on the wireless network on which a mobile device having only the first data processor would not normally operate without substantial reconfiguration.

17. The system of claim 16, wherein utilization of the second data processor allows the mobile device to appear to the network as being a network-compatible device.

18. The system of claim 17, wherein the first data processor is a more powerful processor than the second data processor.

19. The system of claim 1, wherein the data communication channel facilitates inter-processor control by comprising separate dedicated lines between the first and second data processors.

20. The system of claim 19, wherein a single line is used for each control function supported by the wireless communications device.

21. The system of claim 1, wherein the data communication channel comprises a shared memory system, and wherein commands written by one of the first data processor and the second data processor into the shared memory system are read out by the other of the first data processor and the second data processor.

22. The system of claim 1, wherein the data communication channel comprises a shared inter-processor bus, in which commands and responses are placed on the bus for communication to either the first data processor or the second data processor.

23. The system of claim 1, wherein outgoing data to be sent from the mobile device is stored by the first data processor in a memory device.

24. The system of claim 1, wherein outgoing data to be sent from the mobile device is stored by the second data processor in a memory device.

25. The system of claim 1, wherein data to be sent from the mobile device through the wireless network comprise an e-mail message.

26. The system of claim 25, wherein the mobile device comprises a user interface operatively associated with the first data processor, and wherein the e-mail message is composed using the user interface.

27. The system of claim 26, wherein the e-mail message is provided by the first data processor to the second data processor via the data communication channel.

28. The system of claim 25, wherein data received by the mobile device over the wireless network comprise an e-mail message.

29. The system of claim 1, wherein the second data processor receives data packets transmitted over the wireless network, and wherein the second data processor forwards each received data packet to the first processor through the data communication channel as the data packet is received.

30. The system of claim 29, wherein the mobile device comprises a display, and wherein the first data processor processes the received data packets for output to the display.

31. The system of claim 1, wherein data received by the mobile device over the wireless network comprise a text message.

32. The system of claim 1, wherein data received by the mobile device over the wireless network comprise a web page download.

33. The system of claim 1, wherein the second data processor processes data received from the wireless network and provides the processed data to the first data processor through the data communication channel.

34. The system of claim 33, wherein the processed data provided to the first data processor comprises at least a portion of the data received from the wireless network.

35. The system of claim 33, wherein the processed data provided to the first data processor substantially comprises the data received from the wireless network.

36. The system of claim 33, wherein the second data processor performs data transformation operations upon the data received from the wireless network in order to generate the processed data, and wherein the data transformation operations are performed to generate data for use by the first data processor.

37. The system of claim 1, wherein the mobile device comprises a speaker coupled to the first data processor, and wherein data received over the wireless network by the mobile device is output to the speaker.

38. The system of claim 1, wherein the mobile device comprises a speaker coupled to the second data processor, and wherein data received over the wireless network by the mobile device is output to the speaker.

39. The system of claim 1, wherein the second data processor is configured to detect caller identification information for an incoming call and to send the caller identification information to the first data processor via the data communication channel.

40. The system of claim 39, wherein the mobile device comprises a display, and wherein the first data processor processes the caller identification information and displays it on the display.

41. The system of claim 1, further comprising: a transceiver for transmitting signals to and receiving signals from the wireless network.

42. The system of claim 1, wherein the first data processor and the second data processor are different types of microprocessors, and wherein the first data processor comprises a device platform microprocessor and the second data processor comprises a network platform microprocessor.

43. The system of claim 42, wherein the device platform data processor is associated with one or more components, and wherein the components are selected from the group consisting of: a device display, a non-volatile memory, a RAM, auxiliary input/output (I/O) devices, a serial port, a keyboard, a serial interface for communication with the network platform microprocessor, a short-range communications subsystem, a speaker, a microphone, and combinations thereof.

44. The system of claim 42, wherein the network platform data processor is associated with one or more components, wherein the components are selected from the group consisting of: a speaker, a serial interface for communication with the device platform microprocessor, a microphone, a non-volatile memory, a RAM, and combinations thereof.

45. The system of claim 1, wherein utilization of the first data processor and the second data processor on the mobile device allows the at least one mobile device software application configured to be operable with the first data processor to not require modification to be operable with the preselected data processor type which is supported by the wireless network.

46. The system of claim 1, wherein utilization of the first data processor and the second data processor on the mobile device obviates the need to port the at least one mobile device software application to a processor platform which is supported by the wireless network.

47. A system of enabling data communications over a wireless network, operable on a mobile device, comprising:
a first data processor configured to be operable with at least one mobile device software application;
a second data processor of a preselected data processor type required for operation with the wireless network, configured to send and receive data through the wireless network; and
a communication protocol which defines how data is to be exchanged between the first and second data processors,
wherein the communication protocol comprises a first communication protocol to exchange control information between the first data processor and the second data processor and a second communication protocol to handle data received from or to be sent over the wireless network;
wherein the first communication protocol comprises packet sequence numbers and acknowledgements to facilitate reliable transport of packets of control information between the first and second data processors;
wherein a delayed acknowledgement timer is started when a packet is received to reduce number of acknowledgement packet transmissions.

48. The system of claim 47, wherein each packet sequence number is a number assigned to each packet transmitted over a serial link between the first and second data processors.

49. The system of claim 47, wherein a data connection between the first data processor and the second data processor is restarted and the packet sequence number is reinitialized to a value of zero when a configuration control packet is transmitted by either the first data processor or the second data processor.

50. The system of claim 49, wherein the configuration control packet conforms to Link Control Protocol (LCP).

51. The system of claim 49, wherein the configuration control packet conforms to IP Control Protocol (TPCP).

52. The system of claim 49, wherein configuration control packets are exchanged between the first data processor and the second data processor, wherein at least one of the exchanged configuration control packets comprises a configure-request packet, and wherein at least one of the exchanged configuration control packets comprise a configure-acknowledge packet.

53. The system of claim 52, wherein the configure-request packet and the configure-acknowledge packet each have a payload length of zero.

54. The system of claim 48, wherein an acknowledgement conforming to the first communication protocol comprises an acknowledgement packet having a field indicative of the packet sequence number of a packet being acknowledged.

55. The system of claim 47, wherein a packet conforming to the first communication protocol comprises one or more flags to indicate a preselected data communication condition.

56. The system of claim 55, wherein one of the flags indicates that a pre-selected action should be performed by a receiving one of the first and second data processors that receives the packet.

57. The system of claim 55, wherein one of the flags indicates that the packet is a packet receipt acknowledgement packet and that a packet sequence number of a packet being acknowledged is present and valid.

58. The system of claim 47, wherein a packet conforming to the first communication protocol comprises a data field and a length field indicating the length of the data field.

59. The system of claim 58, wherein the data field contains the payload of the packet.

60. The system of claim 47, wherein a retransmit timer is started when a packet is sent so that sent packets which have not been acknowledged after a certain period of time are retransmitted by a sending one of the first and second data processors that sent the packet.

61. The system of claim 60, wherein a packet retransmission counter is used by the sending data processor to determine whether a link recovery should be performed.

62. The system of claim 47, wherein application data is transmitted between the first and second data processors via the second communication protocol, and wherein the second communication protocol comprises UDP/IP (User Datagram Protocol/Internet Protocol).

63. The system of claim 62, wherein the application data comprises user e-mails associated with a data communication software application on the mobile device.

64. The system of claim 62, wherein the first communication protocol and the second communication protocol share a Point-to-Point Protocol (PPP) inter-processor link between the first data processor and the second data processor.

65. The system of claim 64, wherein packet error checking is handled with respect to communications between the first data processor and the second data processor via a checksum function provided by PPP.

66. The system of claim 64, wherein the packet sequence numbers and packet acknowledgements utilized by the first communication protocol facilitate verification of receipt of packets with respect to data communications between the first data processor and the second data processor.

67. The system of claim 66, wherein the first communication protocol comprises a sync byte to prevent the loss of framing.

68. A method of reliably exchanging data packets between a sending data processor and a receiving data processor in a multiple-processor mobile communication device, one of the sending data processor and the receiving data processor comprising a first processor with which software applications on the mobile communication device are configured to operate and the other of the sending data processor and the receiving data processor comprising a second data processor configured for sending and receiving data in a wireless communication network, the method comprising the steps of:
  at the sending data processor:
    transmitting a first data packet to the receiving data processor;
    determining whether an acknowledgement of the first data packet is received from the receiving data processor within a first predetermined period of time after the step of transmitting the first data packet; and
    retransmitting the first data packet to the receiving data processor where an acknowledgement of the first data packet is not received from the receiving data processor within the first predetermined period of time; and
  at the receiving data processor:
    receiving the first data packet;
    determining whether the receiving data processor has a second data packet to transmit to the sending data processor within a second predetermined period of time after the first data packet is received;
    inserting an acknowledgement of the first data packet into the second packet where the receiving data processor has a second data packet to transmit to the sending data processor within the second predetermined period of time; and
    where the receiving data processor does not have a second data packet to transmit to the sending data processor within the second predetermined period of time,
      generating an acknowledgement packet comprising an acknowledgement of the first data packet when the second predetermined period of time elapses; and
      transmitting the acknowledgement packet from the receiving data processor to the sending data processor.

69. The method of claim 68, wherein the step of determining whether an acknowledgement of the first data packet is received from the receiving data processor within a first predetermined period of time after the step of transmitting the first data packet comprises the steps of: setting a retransmit timer to expire when the first predetermined period of time elapses; and determining whether an acknowledgement of the first data packet is received from the receiving data processor before the retransmit timer expires.

70. The method of claim 69, further comprising the step of: stopping the retransmit timer where an acknowledgement of the first data packet is received from the receiving data processor before the retransmit timer expires.

71. The method of claim 70, wherein the step of retransmitting the first data packet comprises the steps of: detecting expiry of the retransmit timer; and retransmitting the first data packet to the receiving data packet in response to the step of detecting.

72. The method of claim 68, wherein the first data packet comprises a sequence number, wherein the second data packet comprises an acknowledgement flag and an acknowledgement number, and wherein the step of inserting an acknowledgement of the first data packet into the second data packet comprises the steps of setting the acknowledgement flag and inserting the sequence number as the acknowledgement number.

73. The method of claim 72, wherein the acknowledgement packet comprises an acknowledgement flag and the sequence number.

74. The method of claim 68, wherein the step of determining whether the receiving data processor has a second data packet to transmit to the sending data processor within a second predetermined period of time after the first data packet is received comprises the steps of: setting a delayed acknowledgement timer to expire when the second predetermined period of time elapses; and determining whether the receiving data processor has a second data packet to transmit to the sending data processor before the delayed acknowledgement timer expires.

75. The method of claim 74, further comprising the step of: stopping the delayed acknowledgement timer where the receiving data processor has a second data packet to transmit to the sending data processor before the delayed acknowledgement timer expires.

76. The method of claim 75, wherein the step of generating an acknowledgement packet comprises the steps of: detecting expiry of the delayed timer; and generating the acknowledgement packet in response to the step of detecting.

77. The method of claim 68, wherein the step of determining whether an acknowledgement of the first data packet is received from the receiving data processor within a first predetermined period of time and the step of retransmitting the first data packet to the receiving data processor where an acknowledgement of the first data packet is not received from the receiving data processor within the first predetermined period of time are repeated a predetermined number of times.

78. The method of claim 77, further comprising the steps of: configuring a connection between the sending data processor and the receiving data processor before the step of transmitting the first data packet; and repeating the step of configuring when the step of retransmitting has been repeated the predetermined number of times.

79. The method of claim 68, wherein the first data packet comprises a sequence number, and wherein the method further comprises the steps of: at the receiving data processor: determining whether a packet having the sequence number was previously received; and dropping the first data packet where a packet having the sequence number was previously received.

80. The method of claim 68, wherein the first data packet further comprises a data field and a length field indicating the length of the data field, and wherein the method further comprises the steps of: at the receiving data processor: determining whether the data field has a length as indicated in the length field; dropping the first data packet where the data field does not have a length as indicated in the length field; and performing the steps of determining whether the receiving data processor has a second data packet to transmit to the second data processor, inserting an acknowledgement of the first data packet into the second data packet, generating an acknowledgement packet, and transmitting the acknowledgement packet only if the data field has a length as indicated in the length field.

* * * * *

UNITED STATES PATENT AND TRADEMARK OFFICE
CERTIFICATE OF CORRECTION

PATENT NO.       : 7,164,904 B2                              Page 1 of 1
APPLICATION NO.  : 10/352585
DATED            : January 16, 2007
INVENTOR(S)      : Nagy et al.

It is certified that error appears in the above-identified patent and that said Letters Patent is hereby corrected as shown below:

Column 14, line 42, please replace "device application" with -- device software application --

Column 18, line 26, please replace "(TPCP)" with -- (IPCP) --

Column 20, line 20, please replace "data packet" with -- data processor --

Signed and Sealed this

Fifth Day of June, 2007

JON W. DUDAS
*Director of the United States Patent and Trademark Office*